United States Patent
Milbredt et al.

Patent Number: 5,133,106
Date of Patent: Jul. 28, 1992

[54] CASTER WITH LOCK

[75] Inventors: Manfred Milbredt, Remscheid; Wolfgang Block, Schwelm, both of Fed. Rep. of Germany

[73] Assignee: Tente-Rollen Gesellschaft mit beschränkter Haftung, Wermelskirchen, Fed. Rep. of Germany

[21] Appl. No.: 589,417

[22] Filed: Sep. 27, 1990

[30] Foreign Application Priority Data

Dec. 23, 1989 [DE] Fed. Rep. of Germany ....... 8915173

[51] Int. Cl.⁵ ............................ B62C 7/02; B60B 33/00
[52] U.S. Cl. .................................. 16/35 R; 188/1.12; 188/69
[58] Field of Search ............ 16/35 R, 35 D; 188/1.12, 69, 335, 343

[56] References Cited

U.S. PATENT DOCUMENTS

| | | | |
|---|---|---|---|
| 2,687,546 | 8/1954 | Oppenheimer | 16/35 R |
| 4,184,227 | 1/1980 | Propst et al. | 16/35 R |
| 4,821,369 | 4/1989 | Daniels | 16/35 R |
| 4,997,066 | 3/1991 | Bigo | 188/69 |

FOREIGN PATENT DOCUMENTS

| | | | |
|---|---|---|---|
| 572044 | 2/1933 | Fed. Rep. of Germany | 16/35 |
| 2312632 | 9/1974 | Fed. Rep. of Germany | . |
| 7523557 | 11/1975 | Fed. Rep. of Germany | . |
| 153601 | 9/1984 | Japan | 16/35 R |
| 984065 | 2/1965 | United Kingdom | . |

Primary Examiner—Robert L. Spruill
Assistant Examiner—Carmine Cuda
Attorney, Agent, or Firm—Martin A. Farber

[57] ABSTRACT

The present invention relates to a caster (1), in particular a steering roller having a wheel (5, 6) and a locking device, the locking device having a setting element (7) and engagement element (9) which cooperates with the setting element so as to block the travel of the wheel (5, 6) in which a linear setting movement of the setting part (7) can be transmitted via a wedge transmission (10) to the engagement element (9). In order to achieve a development which is as simple as possible from a design standpoint and also has advantageous kinematics, the invention proposes that the engagement element 9 be arranged guided for linear movement in order to effect a linear engagement movement with respect to the wheel (5, 6).

13 Claims, 7 Drawing Sheets

CASTER WITH LOCK

Field and Background of the Invention

The present invention relates to a caster, in particular a steering caster having a wheel and a locking device, the locking device having a setting element and an engagement element cooperating therewith in order to block movement of the wheel, it being possible to transmit a linear setting movement of the setting part to the engagement element via a bevel gearing.

Such a caster is known, for instance, from the registered papers of Federal Republic of Germany DE-Gm 75 23 557. In that known caster the engagement element is mounted for rotation around an axle. The linear setting movement of the setting part is converted into a rotating movement of the engagement element. This is expensive from a structural standpoint. Furthermore, particularly in the case of toothed engagement between the engagement element and the wheel, a certain structural limitation due to the circular movement of the engagement element can be noted. The kinematic and structural limitations in this development become particularly clear when the engagement element is arranged within the wheel, i.e. upon action of the engagement element on an inner surface of the wheel.

Summary of the Invention

Proceeding from the prior art set forth above, the object of the present invention is to provide a caster, particularly a steering caster, which, while being of the simplest possible construction and having advantageous kinematics, is suitable, in particular, also for arrangement within a wheel.

It is provided in accordance with the invention that the engagement element is arranged guided for linear movement, namely for linear movement of engagement with respect to the wheel. In accordance with the invention, a wedge transmission is provided between the setting element and the engagement element, the wedge transmission converting the linear movement of the setting element into a linear movement of the engagement element. The engagement element is merely arranged in a linear guide, a turn shaft with respect to the engagement element being dispensed with. It is understood that the cooperating wedge surfaces of the setting element and the engagement element are arranged at such angles that self-blocking does not occur. This will be explained in further detail below. The linear movement of the engagement element results in dependable cooperation between wheel and engagement element. In case of wear of the associated surface of the wheel and/or the engagement element, the place and geometry of the cooperation is nevertheless practically unchanged. In a further development of the caster, it is provided that the engagement element is arranged approximately at a right angle to the setting element. In this case, the axes of the setting element and the engagement element extend approximately in the same plane and accordingly intersect approximately at a right angle. The invention also proposes that the engagement element act on an inner surface of the wheel. For this purpose, the setting part is guided, for instance in known manner by a mounting pin, up to about the level of a horizontal (upon normal operating position of the wheel) plane passing through an axis of rotation of the wheel. The engagement element is arranged for linear movement preferably approximately in this plane. In this way an effective locking device which is at the same time relatively simple from a design and assembly standpoint can be developed even under limited conditions of installation. The wedge surface of the setting part is preferably developed as smooth surface. Since the wheel is furthermore preferably swingable simultaneously around the axis of the setting part, the smooth wedge surface is developed over the full circumference. The downward directed tip is flattened. On the other hand, the cooperating wedge surface of the engagement element is developed as a quarter circle or semi-circle. As will be explained in further detail below, the semicircular wedge surface consists in this case preferably of two partial wedge surfaces. With respect to the wedge angles, it is preferably provided that a wedge surface of the engagement element forms an angle of about 60° to 80°, preferably about 70°, with a longitudinal axis of the engagement element and that a bevel surface of the setting part form an angle of about 20° to 40°, preferably about 30°, with a longitudinal axis of the setting part. In addition, the invention provides that engagement surfaces of engagement element and wheel are toothed. In case of arrangement within the wheel, as is preferably intended, an inner surface of the wheel is correspondingly toothed over its entire circumference. The teeth are preferably developed in such a manner that the tooth flanks form an angle of about 30°. In another preferred development, it is provided that the caster is a twin caster having two wheels. In this case, the engagement element is supported and guided on a support which is arranged centrally between the wheels. The engagement element can be developed in two parts for attachment to each other with inclusion between them of the support on which the engagement element is guided. The engagement element itself can consist preferably of aluminum while the wheel or the corresponding engagement surface of the wheel can consist of steel.

A steering caster with swivel blocking is also an object of the invention. In this connection it is already known, reference being had, for instance, to Federal Republic of Germany OS 35 21 794, to provide three different positions in which a blocking of travel and of swiveling is possible in one position, complete release in a second position and merely a swivel blocking in the third position. In order to avoid damaging the caster in case of overload in the position in which merely swivel blocking is provided, it is provided in accordance with the invention that the swivel blocking is developed as a slip clutch which opens upon overload. The abutment is for this purpose preferably arranged so that it can yield against spring action. The direction-blocking part can be cylindrical and a semicylindrical recess can be developed in the abutment in order to receive the direction-blocking part. It is furthermore preferred here that the semicylindrical recess be developed with a smaller depth than corresponds to an exact semi-circle with respect to the cylindrical shape (or semicylindrical shape of the direction-blocking part). This results, upon overload, in the possibility of the direction-blocking part moving out of the recess in the abutment. Outside the semicylindrical recess, the abutment has otherwise an essentially unstructured surface. When the direction-blocking part is lifted out of the semicylindrical recess due to overload, the slip clutch can engage again due to the wheel swinging back into the pre-established swivel-blocking position. In detail, it is further provided that the abutment is arranged coaxially to the setting part. The direction-blocking part can be developed as cylindrical or semicylindrical projection on the setting part. Upon a corresponding raising or lowering of the setting part, the direction-blocking part engages into the abutment. By the alignment of the direction-blocking part, the swivel-blocking of the wheel is pre-determined in direction. By the spring action on the abutment, the release force of the slip clutch can be adjusted.

The invention will be explained further below with reference to the accompanying drawing, which, however, shows only one embodiment. In the drawing.

Figure 1:
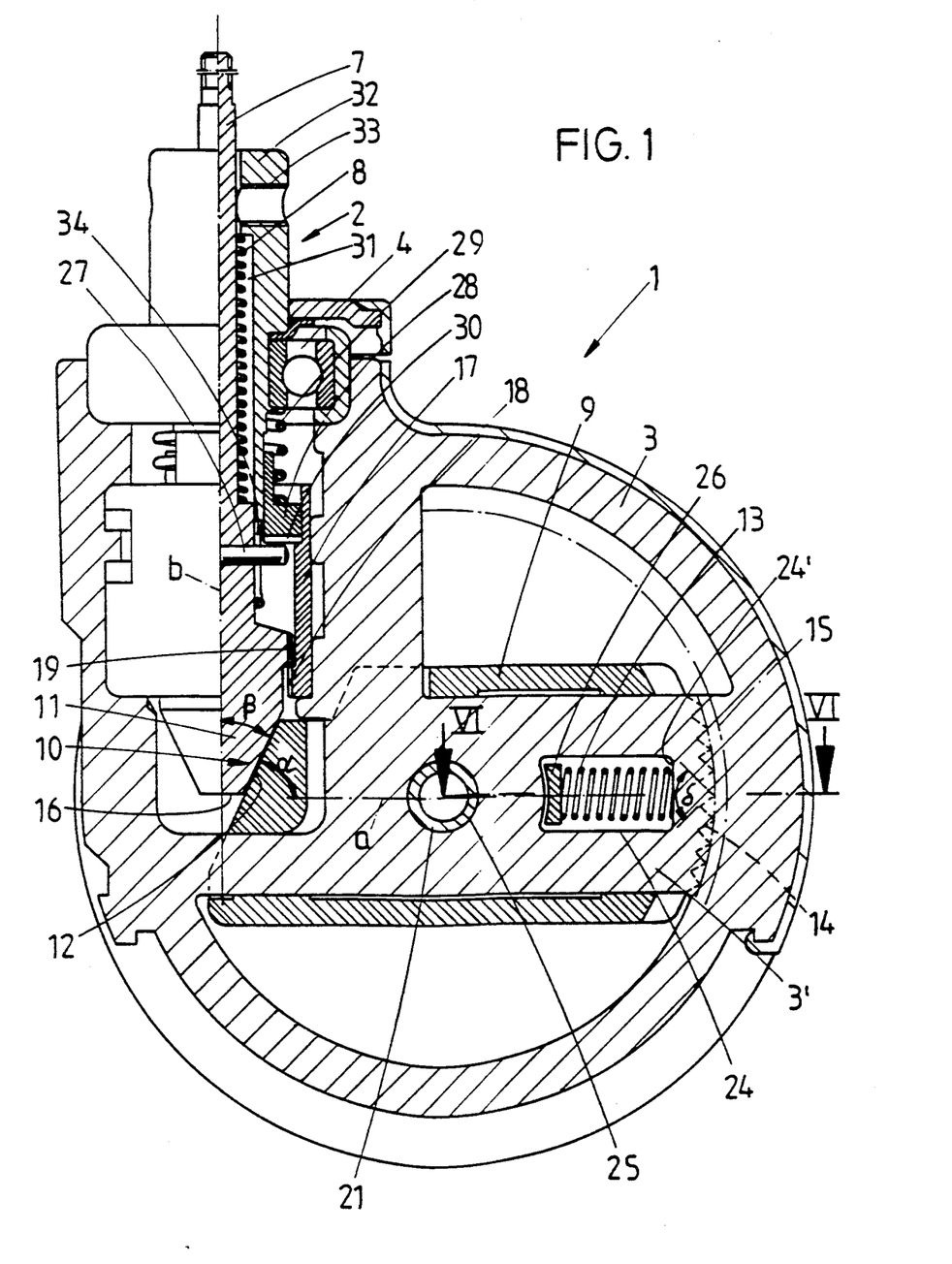
FIG. 1 is a cross section through a caster of the invention which is developed as twin caster, shown in the release position.

Referring to FIG. 1, there is first of all shown and described a caster 1 which is developed as a twin caster and is provided with a mounting pin 2 and a support part 3. By means of a ball bearing 4, the mounting pin 2 is mounted swingable with respect to the support part 3. As can be noted in detail from FIG. 6, the wheels 5 and 6 are mounted for rotation on the support part 3.

Figure 2:
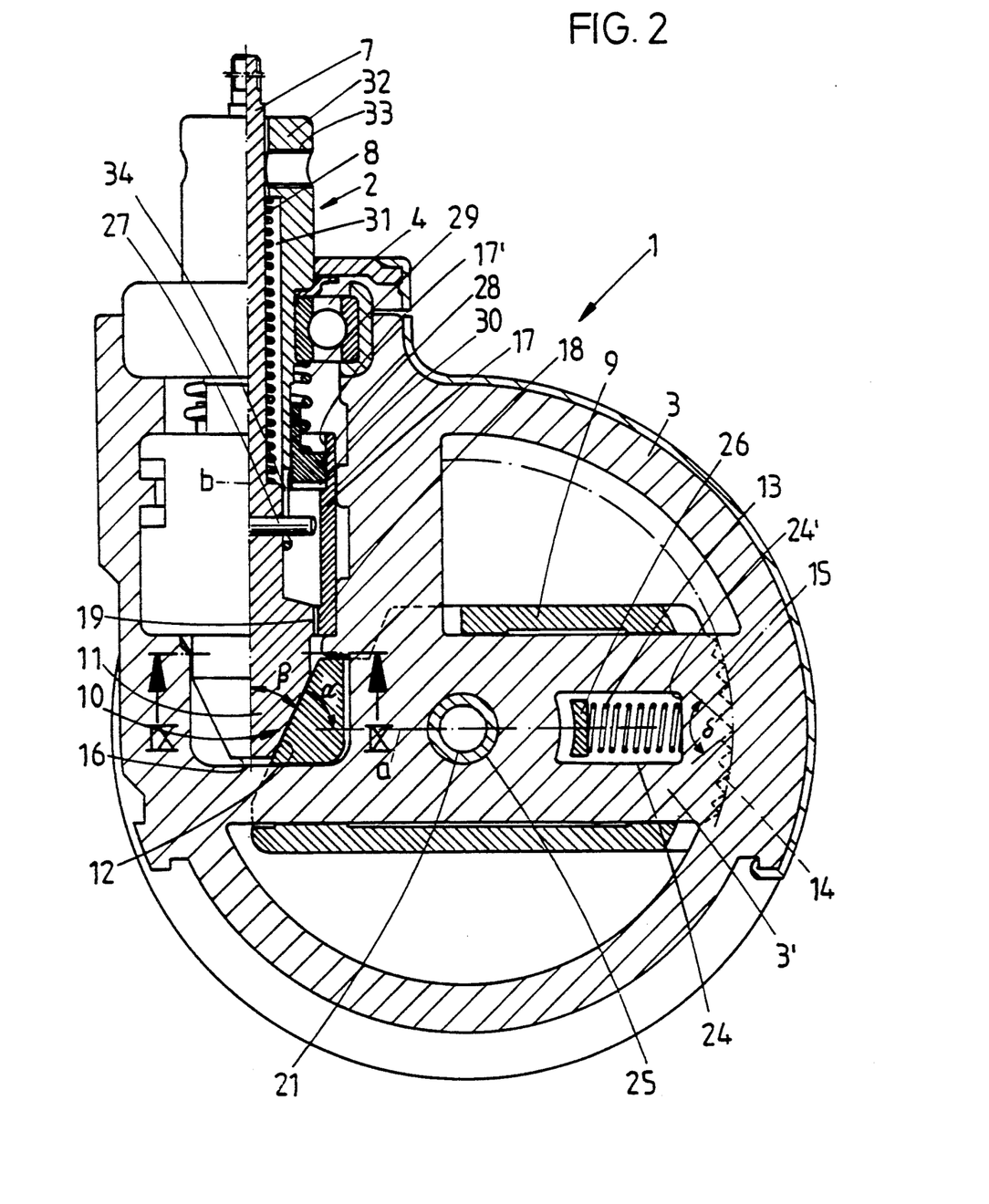
FIG. 2 is a showing according to FIG. 1 in the wheel and swivel blocking position.
Figure 3:
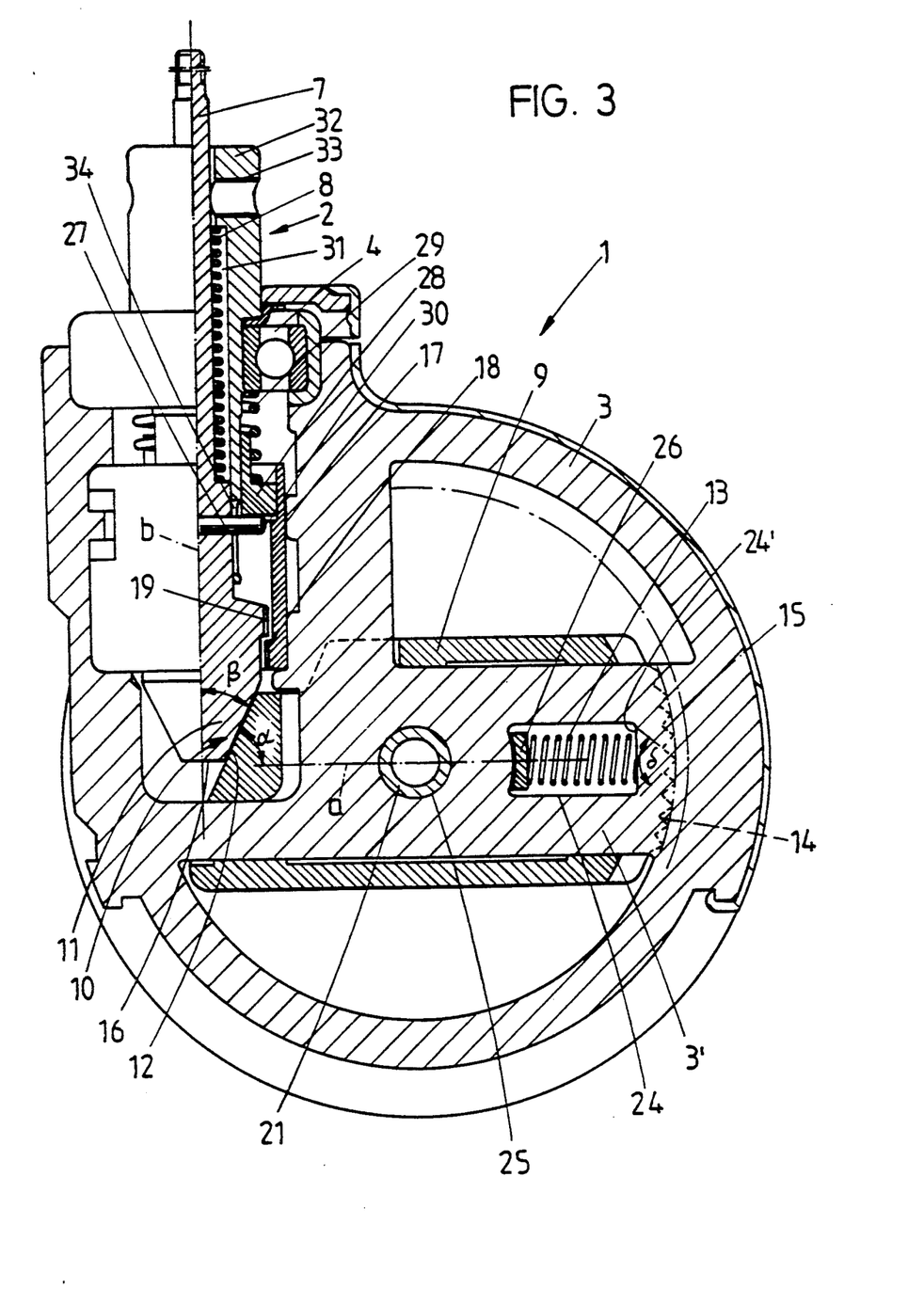
FIG. 3 is a showing according to FIG. 1 in the swivel blocking position.

A setting part 7 is arranged in the mounting pin 2 and can be displaced against the force of the spring 8 out of a blocking position shown in FIG. 2, first of all into the release position shown in FIG. 1 and then into the swivel-blocking position shown in FIG. 3.

In the blocking position of FIG. 1, the setting part 7 cooperates with an engagement element 9. The setting part 7 and the engagement element 9 are both mounted for linear movement. The engagement element 9 and the setting part 7 cooperate via a wedge transmission 10 which has in detail individual wedge surfaces 11 developed on the setting part 7 and wedge surfaces 12 developed on the engagement element 9. The engagement element 9 is urged into the release position by a spring 13 which rests against the support part 3. In the embodiment shown, the engagement element 9 is arranged approximately at a right angle to the setting part 7. An engagement surface 14 of the engagement element 9 acts on an inner surface 15 of a wheel 5 or 6. The engagement surface 14 as well as the inner surface 15 is provided with toothing. The desired locking can, however, also be achieved by developing the surfaces 14 and 15 without toothing but preferably with a high coefficient of friction.

It is essential with respect to the engagement element 9 that in the blocking position it be locked between the setting part 7 and the wheel 5, 6 or the inner surface 15 of the latter on which the engagement element 9 acts. The engagement element 9 cannot be released by passive forces which are, for instance, produced by the toothing or some other interaction with the inner surface 15 of the wheel. Self-blocking is present.

The blocking position of FIG. 2 is released by pulling on the setting part 7. If no pull is effected, the blocking position is obtained or assured by the force of the spring 8. It is understood that the force of the spring 8 is greater than that of the spring 13.

Furthermore, meshing teeth can be provided on the engagement surfaces 14, 15, which teeth have perpendicular flanks or flanks extending radially to the axis of the wheel.

The wedge surfaces 11 and 12 are so developed in detail that the wedge surface 12 forms an angle alpha of about 70° with a central axis a of the engagement element 9, while the wedge surface 11 forms an angle beta of about 30° with a central axis b of the setting part 7. It is understood that the angles of the wedge surfaces 11 and 12 are in each case selected to inhibit jamming.

The wedge surface 11 is furthermore developed as a substantially smooth circumferential surface. The wedge is flattened at its tip 16.

Figure 4:
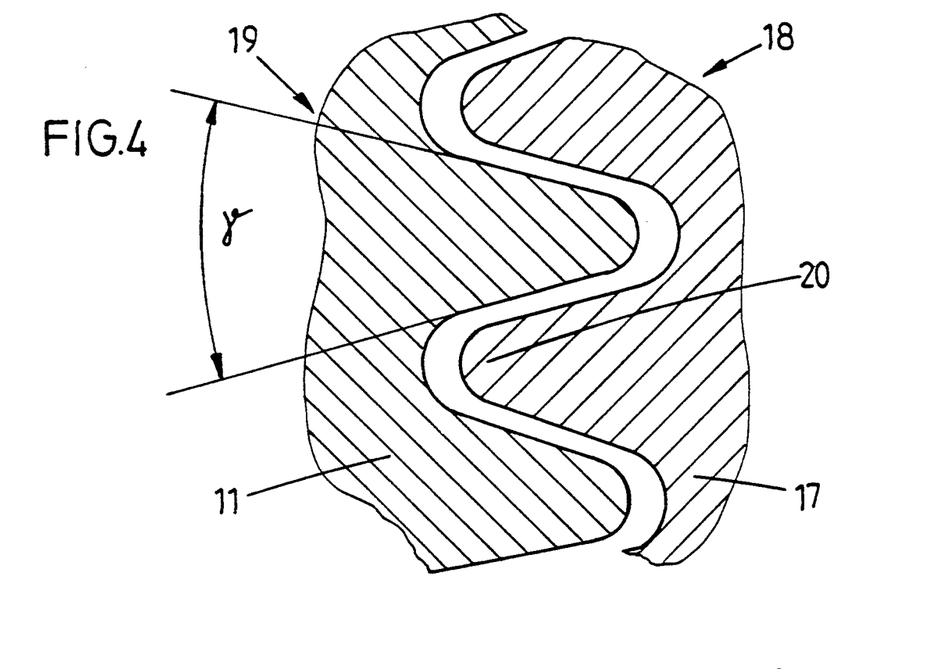
FIG. 4 and FIG. 5 are greatly enlarged showings of the toothing on the engagement element and on the engagement surface of the wheel respectively.
Figure 5:
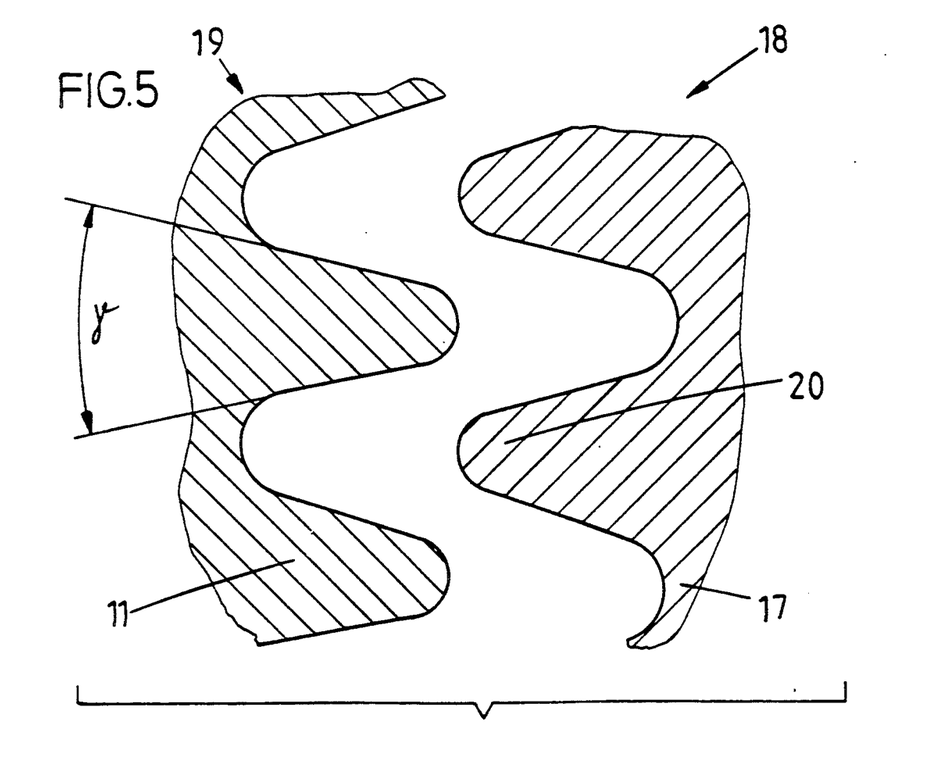
Figure 9:
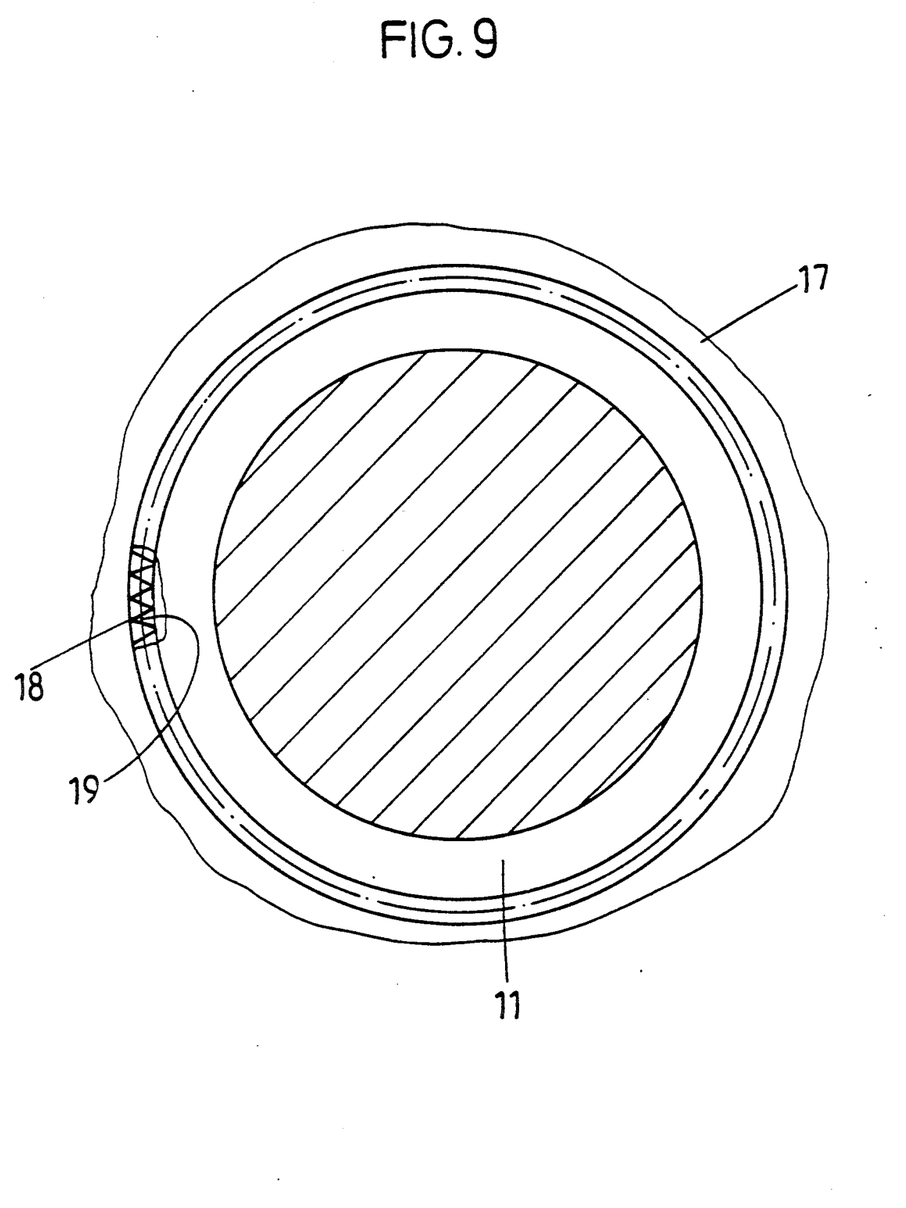
FIG. 9 is a cross-section along the line IX—IX of FIG. 2.

The toothing shown in FIGS. 4 and 5 refers to the toothing in the region of the cross-section of FIG. 9. The setting part 7 cooperates in this case with a sleeve 17 which is attached, fixed for rotation and in fixed position, to the support part 3. This sleeve 17 (see also FIG. 9) is provided with an internal toothing 18 while the setting part 7 is provided outside with an outer toothing 19 in this region. The internal toothing 18 and the outer toothing 19 are provided with teeth 20 which form an angle gamma of about 30° between the tooth flanks. The teeth 20 are furthermore developed with a root width of about 1 mm. About 90 teeth are provided on the circumference, i.e. over 360°.

Figure 6:
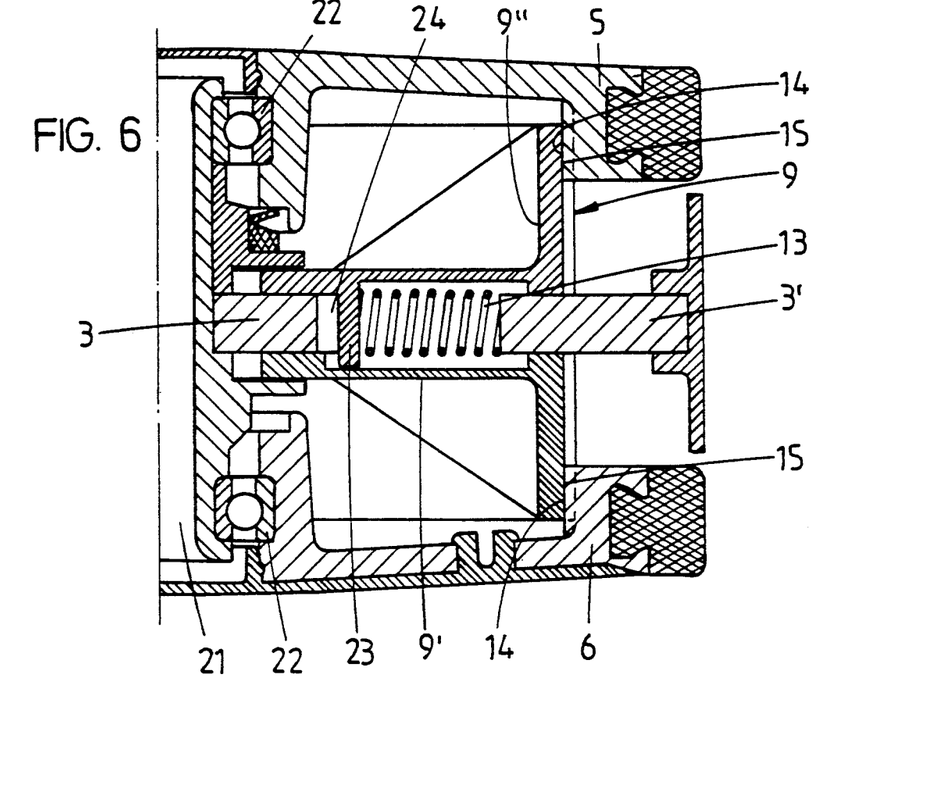
FIG. 6 is a cross-section through the object of FIG. 1 along the line VI—VI of FIG. 1.

The toothing on the engagement surface 14 or the inner surface 15 is developed with substantially pointed teeth of a height of about 1.5 mm and a root width of about 1.5 mm. The showing of FIG. 6 is a cross-section through the object of FIG. 1 along the line VI—VI. Differing from the showing of FIG. 1, the wheel axle 21 is developed as a hollow axle in the showing of FIG. 6. Each of the two wheels 5 and 6 of the twin caster runs, is supported on the wheel axle 21, by a ball bearing 22. The engagement element 9 is formed of two parts; the second part 9' can, for instance, be joined at 23 to the first part 9''. For this, an opening 24 is developed in the support part 3, in which opening the spring 13 also rests.

Figures 10, 11, 12:
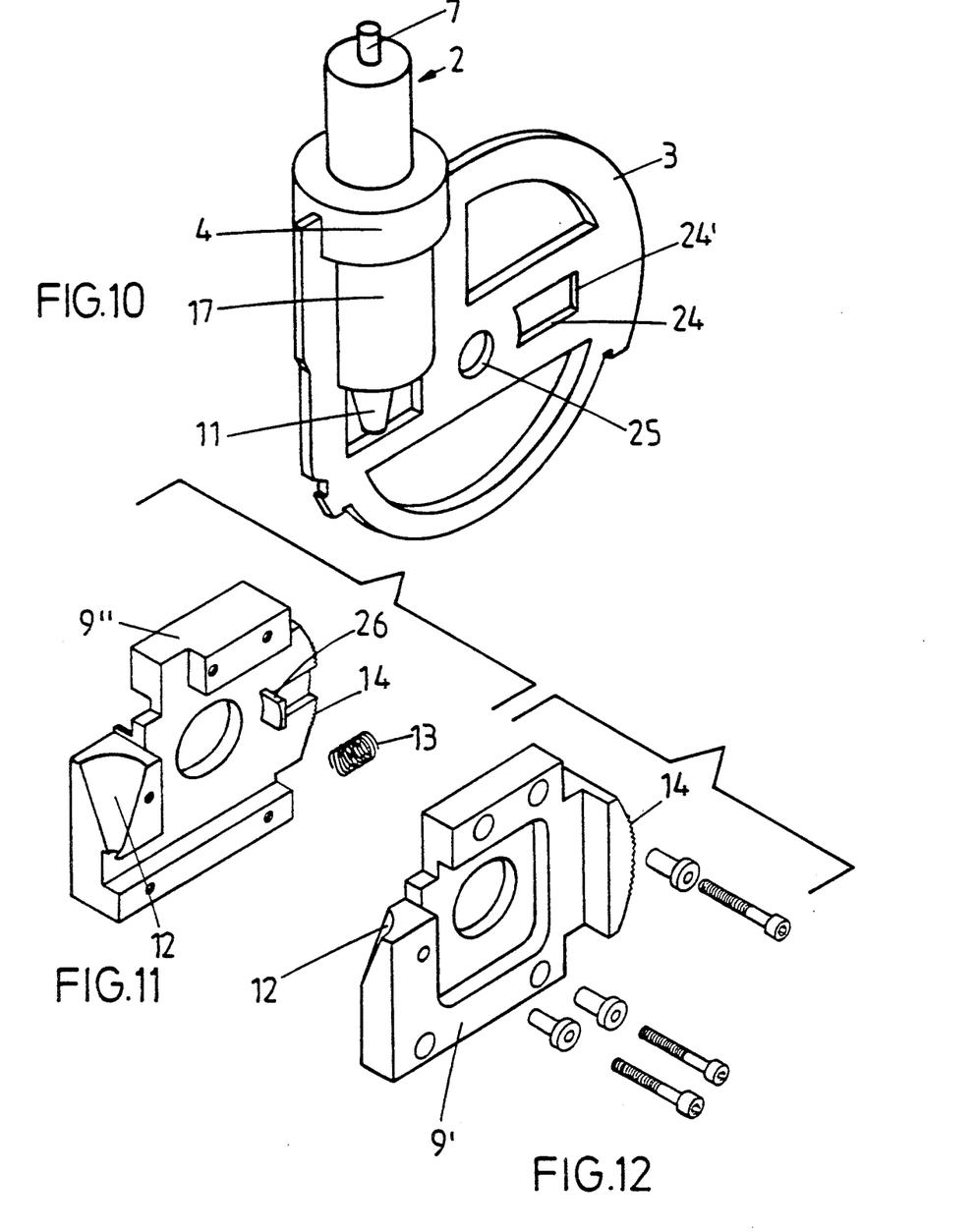
FIG. 10 is a detailed perspective view of a mounting pin together with a support part.
FIG. 11 and FIG. 12 are detailed perspective views of parts of the engagement element.

The construction of the support part 3 together with the engagement element 9 and the mounting pin 2 which receives the setting part 7 can furthermore be noted also from FIGS. 10 to 12. It can be noted that a mounting opening 25 for receiving the wheel axle 21 is developed in the support part 3. Furthermore, in FIG. 10, the opening 24 can be noted through which the connecting of the parts 9' and 9'' of the engagement element 9 can be effected. The spring 13 which is shown in FIG. 11 rests on one end against the side wall 24' of the opening 24 and on the other end against the projection 26 of said first part 9'' of the engagement element 9.

With respect to the mounting pin 2, the sleeve 17 can be noted in FIG. 10, it being firmly connected to the support part 3. An end region of the setting part 7 having the wedge surface 11 extends out of the sleeve 17 on the bottom. Furthermore, the ball bearing 4 is indicated diagrammatically.

It can be noted from FIGS. 11 and 12 that the engagement element 9 is formed of two parts. These parts consist preferably of a suitable plastic. Over an angular region of about 30°–40°, referred to the toothed inner surface of a wheel 5 or 6, a toothing is developed on a front end of the engagement element 9, which end faces away from the wedge surface 12. The wedge surface 12 consists of two conical surfaces which are shaped as quarter-circle segments and are developed on the part 9" and the part 9' respectively. The development of the engagement element 9 of FIGS. 11 and 12 differs in details from the development shown in FIGS. 1, 2, 3 and 6. It is, however, essential that the parts 9' and 9" be attached to each other in installed condition and guided in rail-like manner on the support part 3, as can be noted, for instance from FIG. 1, in that they extend in a vertical section above and below the central beam 3' respectively. Proceeding from the central section 3', the engagement element 9 extends in each case laterally, as seen in the cross-section of FIG. 6, in order to cooperate with the inner surfaces of the wheels 5 and 6.

Figure 7:
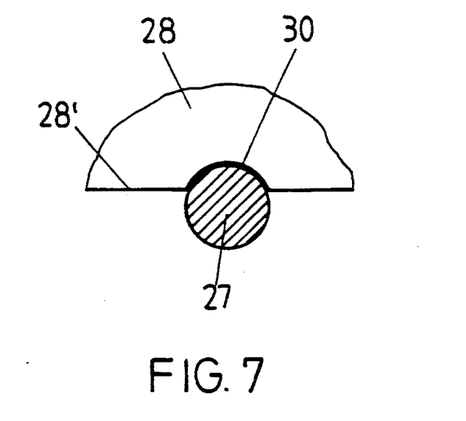
FIG. 7 and FIG. 8 are detailed showings of the slip clutch which is developed on the swivel blocking.
Figure 8:
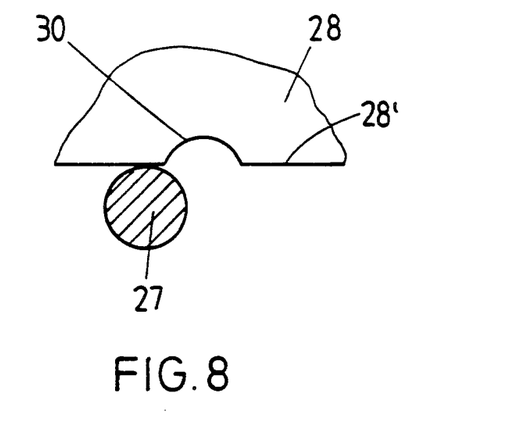

As can furthermore be noted from FIGS. 1 to 3, a direction-blocking part 27, which cooperates with an abutment 28, is developed on the setting part 7. The abutment 28 is contained, fixed for rotation, in the bushing 17. The abutment is, however, axially moveable within the bushing 17. For this a toothing can, for instance, be provided on the inner surface 17' and on the corresponding outer surface of the abutment 28 corresponding to the toothing in the plane of the section IX—IX. Furthermore, the receiving part of the bushing 17 can be developed angular in this region, with correspondingly adapted development of the abutment 28. The abutment 28 is furthermore urged by the spring 29 into the position shown by way of example in FIG. 2. In this embodiment the spring 29 rests against an inner ring of the ball bearing 4. On the bottom of the abutment 28 there is provided an approximately semicylindrical recess 30 in the form of a groove. In the intended direction, and ordinarily therefore in the straight-ahead direction of the caster, the direction-blocking projection, which is furthermore developed cylindrical, as can be noted from the drawing, engages into the recess 30 of the abutment. If the caster is then subjected to overload with respect to its alignment, the direction-blocking part 27 can move out of the abutment 28, i.e. out of the semicylindrical recess 30, since—in this embodiment—the abutment 28 can yield in upward direction. There results the movement shown diagrammatically in FIGS. 7 and 8. In FIG. 7 the direction-blocking part 27 is inserted into the recess 30. In FIG. 8 the direction blocking part 27 has moved out of the recess 30 while displacing the abutment 28 upward. In the condition shown in FIG. 8, the direction-blocking part 27 rests against the flat bottom surface 28' of the abutment 28 merely under initial spring tension. When the wheel is acted on in opposite direction, the direction-blocking part 27 can again snap into the recess 30.

From FIGS. 1, 2, 3 it can also be noted that the setting part 7 is supported via the spring 31 on the bushing 32 which coaxially surrounds the setting part 7. This bushing 32 has a threaded bore hole 33 for attachment, for instance, in a tube part receiving it. The bushing 32 has on its bottom a slot 34 in which the direction-blocking part 27 is guided.

We claim:
1. A caster comprising:
a rotation shaft and a travel wheel mounted on the rotation shaft;
a locking device having an engagement element positioned adjacent the wheel for releasable engagement with the wheel, the locking device further comprising a setting element for placing the engagement element into a position of engagement with the wheel to block a traveling of the wheel;
wherein the locking device includes means for translating a linear setting movement of the setting element into a linear movement of engagement of the engagement element;
the engagement element is moveable in a direction transverse to an axis of rotation of the wheel for engagement with an inner surface of the wheel, the inner surface facing away from the travel surface of the wheel and extending substantially perpendicular to a plane of rotation of the travel wheel; and
the engagement element is lockable in a blocking position between the setting element and the wheel.
2. A caster according to claim 1, wherein
the direction of the linear movement of the setting element differs from the direction of linear movement of the engagement element.
3. A caster according to claim 1, wherein
the direction of the linear movement of the setting element is generally perpendicular to the direction of linear movement of the engagement element.
4. A caster according to claim 3, wherein
the translating means comprises two wedge surfaces which are slidable upon each other.
5. A caster according to claim 1, wherein
the engagement element is arranged approximately at a right angle to the setting element.
6. A caster according to claim 1, wherein
the locking device comprises a wedge surface on the engagement element which forms an angle of about 60° to 80° with a longitudinal axis of the engagement element.
7. A caster according to claim 1, wherein
the locking device comprises a wedge surface on the setting element which forms an angle of about 20° to 40° with a longitudinal axis of the setting element.
8. A caster according to claim 1, wherein the locking device comprises
an engagement surface on the engagement element and an engagement surface on the wheel; and
wherein the engagement surface of the engagement element and the engagement surface of the wheel are provided with teeth.
9. A caster according to claim 8, wherein
the teeth of the engagement surfaces are developed with an angle delta between the tooth flanks of about 35° to 45°.
10. A caster according to claim 1, further comprising means for blocking a swivelling of the caster wherein the swivel blocking means comprises
a direction-blocking part which is fixed to the setting element for rotation therewith;
a roller-fixed abutment located beside the setting element for engagement with the direction-blocking part; and
wherein the swivel blocking means is developed as a slip clutch which opens upon overload.
11. A caster according to claim 10, wherein
the abutment yields to a spring force.
12. A steering caster according to claim 10, wherein
the direction-blocking part has a cylindrical form; and
the abutment has a semicylindrical recess for receiving the direction-blocking part.
13. A steering caster according to claim 10, wherein
the abutment is arranged coaxial to the setting element.

* * * * *